(12) United States Patent
Schroeder et al.

(10) Patent No.: US 7,021,127 B2
(45) Date of Patent: Apr. 4, 2006

(54) SELF-POWERED WIRELESS SENSOR ASSEMBLY FOR SENSING ANGULAR POSITION OF THE ENGINE CRANKSHAFT IN A VEHICLE

(75) Inventors: Thaddeus Schroeder, Rochester Hills, MI (US); Francis E. Szczublewski, Macomb, MI (US); Laci J. Jalics, Ray, MI (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 10/755,776

(22) Filed: Jan. 12, 2004

(65) Prior Publication Data

US 2005/0150281 A1    Jul. 14, 2005

(51) Int. Cl.
*G01M 15/00* (2006.01)
(52) U.S. Cl. .......................... 73/116; 73/117
(58) Field of Classification Search .......... 73/700–756, 73/116–118.1
See application file for complete search history.

(56) References Cited

U.S. PATENT DOCUMENTS

| 4,292,670 | A | 9/1981 | Reid et al. |
| 4,305,072 | A | 12/1981 | Makita |
| 4,782,692 | A | 11/1988 | Peden et al. |
| 5,440,184 | A | 8/1995 | Samy et al. |
| 6,176,123 | B1 * | 1/2001 | Sato ........................ 73/117.3 |
| 6,279,406 | B1 * | 8/2001 | Li et al. .................. 73/861.77 |
| 6,535,135 | B1 * | 3/2003 | French et al. ............... 340/682 |

FOREIGN PATENT DOCUMENTS

| EP | 0594550 A1 | 4/1994 |
| WO | WO 98/11356 | 3/1998 |

* cited by examiner

*Primary Examiner*—Eric S. McCall
*Assistant Examiner*—Jermaine Jenkins
(74) *Attorney, Agent, or Firm*—Jimmy L. Funke

(57) ABSTRACT

A self-powered, wireless sensor assembly is provided for sensing crankshaft position of an engine comprising a rotatable flywheel having a ring gear. The sensor assembly includes an electromagnetic sensor responsive to structural features on the ring gear when the ring gear rotates. A power supply is coupled to generate a direct current in response to the output signal from the electromagnetic sensor. A transceiver is coupled to one of the following sensors: a magnetostatic sensor energized by the power supply and responsive to the structural features on the ring gear to generate an output signal when the ring gear rotates, and the electromagnetic sensor. The transceiver is configured to wirelessly transmit the output signal from that one sensor, wherein the output signal from that one sensor comprises information indicative of the instantaneous speed of said engine.

12 Claims, 2 Drawing Sheets

SELF-POWERED WIRELESS SENSOR ASSEMBLY FOR SENSING ANGULAR POSITION OF THE ENGINE CRANKSHAFT IN A VEHICLE

BACKGROUND OF THE INVENTION

The present invention is generally related to angular sensing, and, more particularly, to a self-powered wireless sensor assembly for sensing angular position of the engine crankshaft in a vehicle, such as a land-based vehicle.

Engine angular position information, i.e., the angular position of the crankshaft, is needed for the control of engine operation, such as determining proper spark and fuel injection timing, etc. Each engine is equipped with a built-in, crankshaft sensor dedicated to engine operation. This sensor together with a toothed magnetic target comprises a crankshaft angle encoder. Its specifications vary from one engine model to another. The resolution typically is in the range of 3 to 60 pulses per revolution, and the angular accuracy is usually ±0.5°. These specifications are generally sufficient for engine operation. There is, however, another application for the crankshaft position information that requires a higher resolution and a better accuracy than the built-in crankshaft sensor system can provide. It is engine diagnostics and performance monitoring based on instantaneous engine speed variations.

The actual engine speed is not constant. Even in a steady state, an internal combustion (IC) engine generally exhibits cyclical speed variations attributable to the operation of its cylinders. Each individual cylinder slows the engine during its compression cycle and speeds it up during its power cycle.

In the field of vehicular diagnostics, accurate instantaneous engine speed information enables the detection and diagnosis of many engine problems, even subtle ones. See, for example, U.S. Pat. Nos. 4,539,841 and 4,520,658, respectively titled "Method For Determining Engine Cylinder Compression Pressure and Power Output" and "Method For Locating Engine Top Dead Center Position," for some exemplary engine diagnostic applications that use accurate, high resolution crankshaft position information together with high accuracy and high resolution instantaneous engine speed information derived from the crankshaft position information. Presently, there is a limited choice in the ways of obtaining such information. For example, it is known that one can tap into the crank sensor wiring, or use a separate, intrusive sensing technique, such as mounting a wired sensor in the bell housing, permanently or just for the duration of the diagnostic procedure, to sense the rotation of the ring gear.

Shortcomings of the first approach for obtaining engine crankshaft position information may include burdensomely locating and gaining access to the crank sensor connector, the location of which connector typically varies from vehicle to vehicle. This generally results in incremental costs since even just a few additional minutes per vehicle cumulatively may add up to substantial costs when servicing a large number of vehicles. More importantly, the accuracy and resolution of the crankshaft position information in the majority of cases would not yield usable instantaneous engine speed information. Similarly, costly and time-consuming inefficiencies may arise with the second approach for obtaining crankshaft position information since intrusive sensing of crankshaft position is generally not conducive to quick and cost-effective servicing and/or diagnostics operations, and often requires costly vehicle modification.

BRIEF SUMMARY OF THE INVENTION

Generally, the present invention fulfills the foregoing needs by providing, in one aspect thereof, a self-powered, wireless sensor assembly for sensing crankshaft position of an engine comprising a rotatable flywheel having a ring gear. The sensor assembly includes an electromagnetic sensor responsive to structural features on the rotating ring gear to generate an output signal. A power supply is coupled to generate a direct current in response to the output signal from the electromagnetic sensor. A transceiver is coupled to one of the following sensors: a magnetostatic sensor energized by the power supply and responsive to the structural features on the ring gear to generate an output signal when the ring gear rotates and the electromagnetic sensor. The transceiver is configured to wirelessly transmit the output signal from the one sensor coupled to the transceiver, wherein the output signal from that one sensor comprises information indicative of the crankshaft position of said engine.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
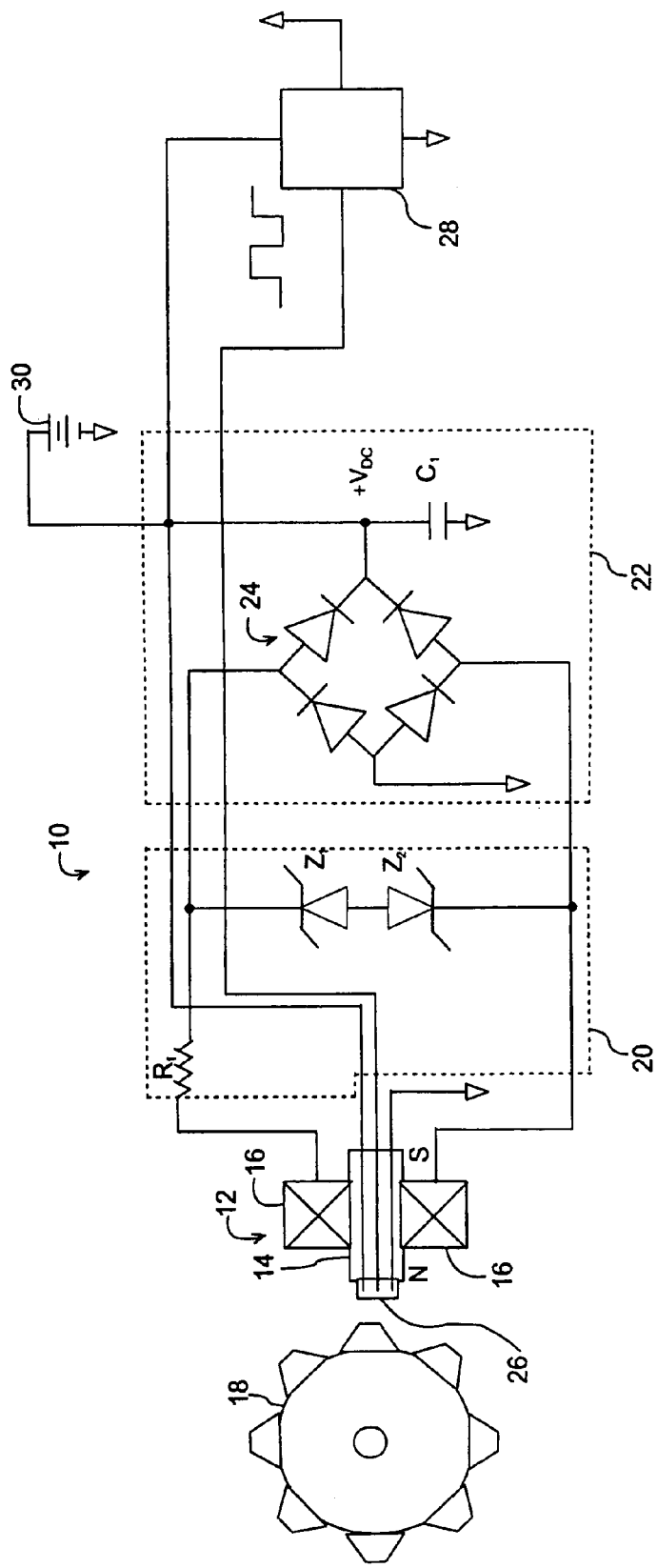
FIG. 1 illustrates a schematic of one exemplary embodiment of a self-powered, wireless sensor assembly for sensing crankshaft position of an internal combustion engine.

As suggested above, even in a steady state condition, an internal combustion (IC) engine may exhibit cyclical speed variations attributable to the operation of its cylinders. The frequency of these speed variation cycles depends on factors such as the number of cylinders in the engine and whether the engine is of a two or a four-cycle type. In two cycle engines, each of the cylinders undergoes respective compression and firing actions during each engine revolution. Hence, there will be as many speed cycles per engine revolution as there are cylinders, and they will be spaced 360/n crank angle degrees (CAD) apart, where n is the number of cylinders. In four cycle engines, one half of the cylinders undergoes respective compression and firing actions during one engine revolution, the other half during the following revolution. In this case there will be n/2 speed cycles per revolution and they will be spaced 720/n CAD apart.

The magnitude of these speed variations may depend on factors such as the compression ratio of the engine, number of cylinders (more specifically, the degree of overlap of compression and firing cycles between the adjacent in firing order cylinders), engine speed and load. For example, in an idling four-cylinder diesel engine the magnitude of speed variations can be as high as 200 RPM, in an idling four-cylinder gasoline engine 60 RPM, and 40 RPM in an 8-cylinder engine. Generally, in a gasoline engine the magnitude of the speed variations will be approximately no more than ±5% of the average engine speed and it will decrease at higher engine speeds. A simple calculation shows that a prior art crankshaft sensor providing 60 pulses/rev with typical accuracy of ±0.5° may introduce a speed error $\epsilon=\pm 0.5°/(360°/60)=\pm 8.33\%$, which would obliterate the ±5% speed variation signal. Aspects of the present invention provide a crankshaft position sensor with a resolution of approximately no less than 5°, and pulse-to-pulse accuracy better than approximately ±0.5%, which for a resolution of 5° corresponds to ±0.025°. Serendipitously, a magnetic target compatible with such sensing resolution and accuracy already exists in every vehicle with an internal combustion engine—the ring gear used by the starter for cranking the engine. Number of teeth in excess of 90, large diameter and machining accuracy required in gear production makes the ring gear suitable as a high quality target wheel.

It is noted that in any practical embodiment, any signal or data indicative of engine crankshaft position information should be obtained directly from the crankshaft of the engine of the vehicle. For example, one may conceptually consider using any of the belt-driven pulleys or other rotating accessories in the vehicle to extract engine crankshaft position information and use it to derive engine speed information, since such pulleys or accessories may be readily accessible. Such information, however, would likely be affected by the fairly complex dynamics of the harmonic balancer and the drive belt, and, in practice, may differ considerably from the actual crank speed of the engine.

FIG. 1 is a block diagram of one exemplary embodiment of a self-powered, wireless sensor assembly 10 for sensing crankshaft position of an internal combustion engine such as may be used for deriving accurate engine speed information for engine diagnostic applications. The sensor assembly 10 may include an electromagnetic sensor, e.g., a variable reluctance (VR) sensor 12 comprising a permanent magnet 14 and a coil 16 wound about the permanent magnet. Electromagnetic sensor 12 may be responsive to structural features (e.g., teeth, slots) on a rotating target wheel 18 to generate an output signal indicative of the relative positioning of such structural features. The output voltage from electromagnetic sensor 12 may be coupled to a voltage limiter 20 to limit the output voltage from electromagnetic sensor 12 to an appropriate magnitude (e.g., +/−5 V). In one exemplary embodiment, the voltage limiter may comprise a resistor (e.g., resistor R1) and two back-to-back Zener diodes, such as Zener diodes Z1 and Z2. The output voltage from the voltage limiter 20 may be coupled to a power supply circuit 22, such as may be made of a full bridge rectifier 24 and a filter capacitor C1. The power supply circuit 22 converts the output from voltage limiter 20 into a DC voltage that may be used for powering electronic components of the sensor assembly 10. Examples of such electronic components may include a Hall device 26 and a transceiver 28.

As will be appreciated by those skilled in the art, the Hall device 26 may comprise a commercially available integrated circuit including signal-processing circuits for generating a stream of pulses that may be correspond to the passing tooth edges of the wheel. An example of a suitable Hall device could be the Hall Gear-tooth Sensor A3064LKA manufactured by Allegro MicroSystems, Inc. It will be further appreciated that Hall device 26 represents just one example of a magneto-static sensor, such as magnetoresistive sensors and other such sensors.

In one exemplary embodiment, the sensor assembly 10 may be positioned to sense structural features on a ring gear. That is, sensor assembly 10 may be mounted proximate the circumferential periphery of a flywheel rotatably connected to a crankshaft of the engine and including a toothed ring gear. The stream of pulses from the Hall device would be coupled to the transceiver 28 to be wirelessly transmitted to an appropriate receiver (not shown). The processing of the stream of pulses to calculate the instantaneous angular speed of the ring gear may be performed using algorithms well known by those skilled in the art and will not be discussed in great detail for purposes of the present invention. One simple technique would be to measure the time interval between successive tooth edges, and assuming equidistant separation between successive tooth edges, then the instantaneous speed would be simply the ratio of such separation over each measured time interval.

The sensor assembly may be configured to operate in two separate modes: free running and on-demand. For example, in the free-running mode, the transceiver 28 may transmit the stream of pulses as long as the power supply circuit 22 is able to appropriately energize the electronic components connected to such power supply. In the on-demand mode, engine data would be transmitted in response to an appropriate request signal received by the transceiver 28.

In one exemplary embodiment, a rechargeable battery cell 30 may be optionally provided in combination with the power supply circuit 22. For example, the rechargeable battery may be charged whenever the electromagnetic sensor generates a sufficiently strong signal and the electrical energy stored in the cell would allow transceiver operation even at very low engine RPM, e.g. during cold cranking, when the signal from the electromagnetic sensor is inadequate to generate sufficient power to energize the electronic components coupled to power supply 22.

Figure 2:
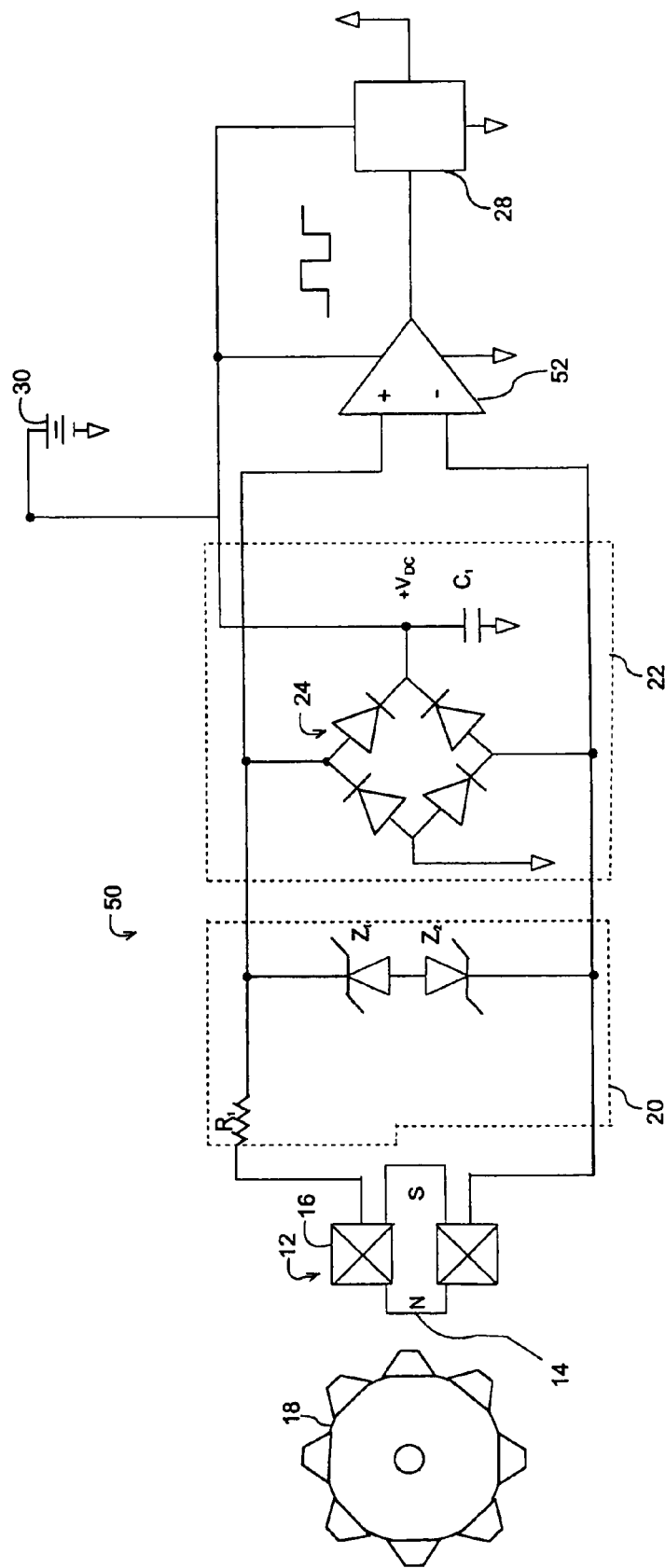
FIG. 2 illustrates a schematic of another exemplary embodiment of a sensor assembly for sensing crankshaft position.

FIG. 2 is a block diagram of another exemplary embodiment of a self-powered, wireless sensor assembly 50 for sensing instantaneous speed of an internal combustion engine. In this embodiment, the output signal from electromagnetic sensor 12 is used both for power generation and for sensing the crankshaft position. In this embodiment, a comparator device 52 may be used to process the analogue output signal from the electromagnetic sensor 12. The output signal from the comparator 52 would comprise the stream of pulses indicative of crankshaft position that would be passed to the transceiver 28.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A self-powered, wireless sensor assembly for sensing crankshaft position of an engine comprising a rotatable flywheel having a ring gear, the sensor assembly comprising:
    an electromagnetic sensor responsive to structural features on said ring gear to generate an output signal when the ring gear rotates;
    a power supply coupled to generate a direct current in response to the output signal from the electromagnetic sensor; and
    a transceiver energized by said power supply and coupled to one of the following sensors: a magnetostatic sensor energized by said power supply and responsive to the structural features on said ring gear to generate an output signal when the ring gear rotates, and said electromagnetic sensor, said transceiver configured to wirelessly transmit the output signal from the one sensor coupled thereto, wherein the output signal from the one sensor coupled to the transceiver comprises information indicative of the crankshaft position of said engine, wherein said sensor assembly is configured to alternatively operate in a continuously-running mode in response to rotation of said ring gear, and in an on-demand mode in response to an externally-derived request signal wirelessly received by the transceiver.

2. The sensor assembly of claim 1 wherein said electromagnetic sensor comprises a variable reluctance sensor.

3. The sensor assembly of claim 1 wherein said magnetostatic sensor comprises a sensor selected from the group consisting of a Hall sensor and a magnetoresistive sensor.

4. The sensor assembly of claim 1 further comprising a battery cell electrically coupled to the power supply, said battery cell chargeable in response to the output signal from the electromagnetic sensor, said battery cell configured to supply power when engine RPM falls below a threshold limit for appropriately energizing electronic circuits coupled to the power supply.

5. A self-powered, wireless sensor assembly for sensing crankshaft position of an engine comprising a rotatable flywheel having a ring gear, the sensor assembly comprising:
   an electromagnetic sensor responsive to structural features on said ring gear to generate an output signal when the ring gear rotates;
   a power supply coupled to generate a direct current in response to the output signal from the electromagnetic sensor; and
   a transceiver energized by said power supply and coupled to said electromagnetic sensor, said transceiver configured to wirelessly transmit the output signal from the electromagnetic sensor, wherein the output signal from the electromagnetic sensor comprises information indicative of the crankshaft position of said engine,
   wherein said sensor assembly is configured to alternatively operate in a continuously-running mode in response to rotation of said ring gear, and in an on-demand mode in response to an externally-derived request signal wirelessly received by the transceiver.

6. The sensor assembly of claim 5 wherein said electromagnetic sensor comprises a variable reluctance sensor.

7. The sensor assembly of claim 5 further comprising a battery cell electrically coupled to the power supply, said battery cell chargeable in response to the, output signal from the electromagnetic sensor, said battery cell configured to supply power when engine RPM falls below a threshold limit for appropriately energizing electronic circuits coupled to the power supply.

8. A self-powered, wireless sensor assembly for sensing crankshaft position of an engine comprising a rotatable flywheel having a ring gear, the sensor assembly comprising:
   an electromagnetic sensor responsive to structural features on said ring gear to generate an output signal when the ring gear rotates;
   a power supply coupled to generate a direct current in response to the output signal from the electromagnetic sensor; and
   a transceiver energized by said power supply and coupled to a magnetostatic sensor energized by said power supply and responsive to the structural features on said ring gear to generate an output signal when the ring gear rotates, said transceiver configured to wirelessly transmit the output signal from the magnetostatic sensor, wherein the output signal from the magnetostatic sensor comprises information indicative of the crankshaft position of said engine,
   wherein said sensor assembly is configured to alternatively operate in a continuously-running mode in response to rotation of said ring gear, and in an on-demand mode in response to an externally-derived request signal wirelessly received by the transceiver.

9. The sensor assembly of claim 8 wherein said electromagnetic sensor comprises a variable reluctance sensor.

10. The sensor assembly of claim 8 wherein said magnetostatic sensor comprises a sensor selected from the group consisting of a Hall sensor and a magnetoresistive sensor.

11. The sensor assembly of claim 8 further comprising a battery cell electrically coupled to the power supply, said battery cell chargeable in response to the output signal from the electromagnetic sensor, said battery cell configured to supply power when engine RPM falls below a threshold limit for appropriately energizing electronic circuits coupled to the power supply.

12. A self-powered, wireless sensor assembly for sensing crankshaft position of an engine comprising a rotatable flywheel having a ring gear defining a plurality of circumferentially equi-spaced teeth, the sensor assembly comprising:
   an electromagnetic sensor disposed to sense the presence or absence of said ring gear teeth in proximity thereto and to generate an output signal as a function of rotation of the ring gear;
   a power supply coupled to generate a direct current in response to said output signal; and
   a transceiver energized by said power supply and coupled to said sensor, said transceiver operative to wirelessly receive externally-derived request signals and to selectively wirelessly transmit said output signal to a remote receiver,
   wherein, said sensor assembly is configured to operate in a continuously-running mode in response to rotation of said ring gear in the absence of said request signals, and in an on-demand mode in response to said request signals.

* * * * *